United States Patent [19]

Manino

[11] 3,859,258
[45] Jan. 7, 1975

[54] VULCANIZATION AND DIRECT BONDING OF DIENE ELASTOMERS

[75] Inventor: Louie G. Manino, Erie, Pa.

[73] Assignee: Lord Corporation, Erie, Pa.

[22] Filed: Feb. 2, 1973

[21] Appl. No.: 329,141

[52] U.S. Cl.............. 260/77.5 CR, 260/77.5 ST, 260/80.70, 260/80.78, 260/85.1, 260/85.3 C, 260/88.2, 260/92.3, 260/94.7 R, 260/768

[51] Int. Cl... C08g 22/00, C08g 22/32, C08c 11/40
[58] Field of Search.......... 260/80.7, 77.5 CR, 923, 260/80.78, 85.3 C, 768, 88.2

[56] References Cited
UNITED STATES PATENTS

| | | | |
|---|---|---|---|
| 2,918,446 | 12/1959 | Sernivk et al.............. | 260/85.3 C |
| 3,694,389 | 9/1972 | Levy............................ | 260/77.5 C |
| 3,711,454 | 1/1973 | Vsamoto................ | 260/77.5 CR X |

*Primary Examiner*—Joseph L. Schofer
*Assistant Examiner*—Herbert J. Lilling
*Attorney, Agent, or Firm*—Howson & Howson

[57] ABSTRACT

A general purpose non-sulfur vulcanization system for a wide variety of diene elastomers involves the use, in combination, of 1 to 6 phr of an aryl dioxime and 1 to 9 phr of a polyisocyanate. These components are either individually dispersed in the elastomer to be cured or are pre-reacted to form an adduct which is then dispersed in the elastomer; the total concentration of the combined components in either case being about 2 to 13 phr. The compounded elastomer is vulcanized under conventional vulcanization conditions to provide vulcanizates having desirable properties. The incorporation of an aryl dioxime and a polyisocyanate in diene elastomers also improves the bonding of the elastomers with conventional primers and adhesives. In order to improve the direct bonding of elastomers, such as natural and polychloroprene, without the use of primers or adhesives, the aryl dioxime and polyisocyanate should be incorporated in proportions such that free polyisocyanate is present, e.g., 2 phr aryl dioxime to 6 to 9 or even more phr of polyisocyanate. The optimum level of free polyisocyanate for direct bonding depends upon the substrate and elastomer to be bonded.

13 Claims, No Drawings

VULCANIZATION AND DIRECT BONDING OF DIENE ELASTOMERS

BACKGROUND OF THE INVENTION

It is, of course, well-known that sulfur compounds have been used in the vulcanization of rubber for more than a hundred years and that such systems have reached a high degree of development. Sulfur-cured rubbers, while economical to produce, are less than desirably resistant to cure reversion and oxidative and thermal degradation. It is obvious, moreover, that the residual sulfur content of such rubbers precludes their use in certain applications in which sulfur is detrimental. There is also a continuing trend toward more and more stringent conditions of use for cured rubber products necessitating performance characteristics which cannot be met by the products of the available sulfur vulcanization systems. Still further, a need has developed for greater production efficiency demanding the use of shorter curing cycles and higher curing temperatures than are possible in the traditional sulfur vulcanization systems. It is apparent, therefore, that a need has existed in the art for non-sulfur vulcanizing systems.

It is also well-known that many elastomers are not inherently adherent either to themselves or to other substrates and, indeed, are difficult to bond even with the use of available primers and adhesives. Inasmuch as it is often desirable to bond these materials either to themselves or to other substrates, the art has sought to accomplish this purpose in a variety of different ways including the use of primers or other surface coatings or interlayers as well as by modification of the chemical structure of the elastomer or incorporation of various materials in the elastomer. However, a need has remained in the art for a method for imparting direct bonding properties to elastomers, preferably without the need for primers or separate adhesive or other interlayers.

THE PRIOR ART

Several non-sulfur vulcanizing systems have been developed. Among these may be mentioned the use of maleimides and particularly bis-maleimides as vulcanizing agents. Another non-sulfur vulcanization system which involves the use of urethane cross-linkers is described in Baker et al, "New Reactions For The Vulcanization Of Natural Rubber" published in *Rubber Chemistry & Technology*, Volume 43, No. 3, May 1970; the discussion at pages 510 through 519 being of particular interest. Basically, such urethane cross-linking systems involve treating natural rubber or other polyunsaturated elastomers with nitrosophenols or nitrosoanilines to react the nitroso groups with the rubber molecule, thus providing pendant hydroxyl or amino groups, which are then reacted with diisocyanates to obtain the desired cross-linking. This may be accomplished in several different ways, but the preferred method is to pre-react a nitrosophenol, probably in its oxime form, with a diisocyanate to produce a compound which is generally and conveniently referred to as a diurethane, although it is not a true urethane. Such diurethanes are stable, non-staining and non-hazardous materials which can be readily incorporated into rubber and which decompose at temperatures of about 120° to 200°C. depending on their structure, into free nitrosophenol and diisocyanate which are then available for cross-linking under conventional vulcanizing conditions.

While both the bis-maleimide and diurethane vulcanization systems provide cured rubbers having certain advantages, these curing systems are relatively expensive in comparison to sulfur vulcanization systems and, for this reason, the resulting vulcanizates are generally restricted to use in premium applications where their excellent properties are required and their cost can be justified.

Another non-sulfur vulcanizing system employing a synergistic mixture of known urethane and maleimide cross-linking agents in conjunction with a known accelerator for the urethane component is described in Sexsmith and Gervase U.S. patent application Ser. No. 305,989, filed Nov. 13, 1973. This system, however, is useful only with relatively highly unsaturated elastomers and not with butyl rubber or EPDM rubber for example.

Cousins U.S. Pat. No. 2,835,624 issued May 20, 1958 describes a solution containing 7–8% butyl rubber in a solvent which may be a mixture of moderately high-boiling petroleum ether (e.g., 90° to 120°C.) and which also contains from 5 to 50 parts by weight of a polyisocyanate and 0.25 to 10 parts by weight of a polyparadinitrosobenzene per 100 parts of butyl rubber in the solution. It is also stated that any aromatic dinitroso compound or dioxime may be substituted for the polyparadinitrosobenzene. Rayon tire cord is dipped in this solution, dried, embedded in butyl rubber and cured to aid in bonding the butyl rubber to the tire cord. Among the polyisocyanates useful in the Cousins patent is a mixture of diisocyanate, triisocyanate, tetraisocyanate etc. prepared by the phosgenation of an aniline-formaldehyde condensation product as described in U.S. Pat. No. 2,683,730 issued July 13, 1954, which material is believed to be the polymethylene poly(phenylisocyanate) available under the trademark "PAPI" from the Upjohn Company. This patent also states that any other organic isocyanate may be employed and lists many specific compounds of this type. Representative operable dioximes are listed as including p-quinone dioxime, naphthoquinone dioxime, toluquinone dioxime, diphenoquinone dioxime and diquinoyl dioxime.

Ueno et al. U.S. Pat. No. 3,438,922 issued Apr. 15, 1969 discloses an adhesive composition consisting of an aqueous dispersion of the reaction product of (1) an isocyanate blocking agent which may be a phenol, an active methylene compound or an oxime, and (2) a polymeric modified triisocyanate produced by the reaction of an aromatic diisocyanate with a trifunctional polyester having a molecular weight of about 1000–4000, the isocyanate groups of the reaction product being completely blocked. The useful diisocyanates include toluene diisocyanate (TDI) and methylene bis(4-phenyl isocyanate) (MDI) as well as dianisidine diisocyanate (DADI) among others. The oximes employed as blocking agents are monoximes such as methyl ethyl ketone oxime and cyclohexanone oxime.

U.S. Pat. No. 2,994,672 issued Aug. 1, 1961 discloses bis-phenol adducts of isocyanates, such as methylene bis(4-phenyl isocyanate) (MDI) and hexamethylene diisocyanate, useful for improving the bonding of tire cord.

Cousins U.S. Pat. No. 2,690,780 issued Oct. 5, 1954 relates to the compounding of butyl rubber with a mixture of an organic isocyanate and an aromatic dinitroso compound or an aromatic dioxime. This patent states that any organic isocyanate may be employed and lists a wide variety of such compounds. It is also stated that dioximes produced by oxidation of the corresponding aromatic dinitroso compounds are useful in the invention and gives, as representative examples, the same dioximes listed in Cousins U.S. Pat. No. 2,835,624 referred to above. These dioximes are incorporated in the butyl rubber at concentrations of 0.01 to 1 part by weight together with 0.1 to 20 parts by weight of the organic isocyanate compound in order to improve the properties of the butyl rubber, both before and after vulcanization.

In U.S. Pat. No. 2,918,446 issued Dec. 22, 1959 a vulcanizable composition is described containing (1) butyl rubber modified with about 0.1 to 10% by weight (based on the rubber) of an aromatic nitroso compound having only one nitroso group directly attached to the aromatic nucleus, and (2) 0.1 to 20% based on the modified butyl rubber of an aliphatic or aromatic diisocyanate.

While the bis-maleimide, diurethane, and other non-sulfur vulcanizing systems for unsaturated rubbers referred to above offer advantages, it is apparent that a need still exists in the art for a more efficient and lower cost non-sulfur vulcanization system operable for a wide variety of unsaturated elastomers and which is capable of providing cured rubber products having desirable properties.

It is an object of the present invention, therefore, to provide a novel general vulcanization system for unsaturated elastomers which is more efficient and less costly than presently available non-sulfur vulcanization systems, but which is capable of producing vulcanizates having good processing safety, high reversion resistance, excellent dynamic properties, and good resistance to thermal and oxidative degradation on aging.

It is another object of the invention to provide novel vulcanizing compositions which are capable of vulcanizing unsaturated elastomers to produce vulcanizates with a desirable spectrum of properties.

It is also apparent that while various attempts have been made to improve the bonding properties of certain elastomers, that a need remains for a system applicable to a wide variety of diene elastomers for improving their ability to bond to themselves or to other substrates with or preferably without the use of primers, or separate adhesive or other interlayers, and it is another object of the invention to provide such a system.

SUMMARY OF THE INVENTION

The present invention relates to a general purpose non-sulfur vulcanization system for a wide variety of diene elastomers which comprises the use of an aryl dioxime in conjunction with a polyisocyanate which may be any compound containing two or more reactive isocyanate groups. The new vulcanization system may be employed by individually adding the aryl dioxime and polyisocyanate to the elastomer to be cured and blending the mixture by conventional dispersion techniques, or the two components of the system may be prereacted to form an adduct which is thereafter dispersed in the elastomer. In either case, it has been found that the new vulcanization system is sufficiently stable in the elastomer at room temperatures to provide compounded elastomers having adequate bin stability or storage life. This is not surprising with respect to the aryl dioxime-isocyanate adducts since they are stable at room temperature. With respect to the elastomers into which the aryl dioxime and polyisocyanate have been separately dispersed, it is believed that their stability is due to the formation during blending of a hindered species such as a complex urethane type material made up of the aryl dioxime-polyisocyanate components.

When the elastomers containing the new vulcanization system in either of the forms described above are subjected to conventional vulcanization temperatures, cross-linking is initiated. It is difficult to speculate constructively on the chemistry of the vulcanization that takes place as to either the type or sequence of reactions. Certainly, it is very different from vulcanization with an aryl dioxime in the presence of oxidizing agents. It is known that the new system provides a higher state of cure than is obtainable with either the aryl dioxime or polyisocyanate alone.

As noted above, any aryl dioxime may be employed in the invention among which may be listed, without limitation, p-benzoquinone dioxime (QDO), which is preferred, naphthoquinone dioxime, toluquinone dioxime, diphenoquinone dioxime, diquinoyl dioxime and dibenzoyl dioxime.

The polyisocyanates useful in the invention as noted above include any compound containing at least two reactive isocyanate groups and thus excludes the monoisocyanates. Without limitation, the useful polyisocyanates include the aliphatic and aromatic diisocyanates such as benzene diisocyanate, toluene diisocyanate (TDI) including both the 2,4- and 2,6-isomers and mixtures thereof, hexamethylene diisocyanate, and dimers and trimers of these diisocyanates, methylene bis (4-phenyl isocyanate) (MDI) and the corresponding saturated compound methylene bis(4-cyclohexyl isocyanate) (hydrogenated MDI) among others; and higher polyisocyanates including the polyisocyanate of hexamethylene diamine urea condensate, and polymethylene poly(phenyl isocyanate), i.e., polymeric MDI, polymeric TDI, and the like. The preferred polyisocyanate is a polymethylene polyphenylisocyanate obtained by phosgenation of the rearrangement product of the reaction of aniline and formaldehyde described in U.S. Pat. No. 2,683,730 issued July 13, 1954, which is commercially available as "PAPI" from the Upjohn Company. A wide variety of these materials are available under the trademarks "Mondur" from Mobay Chemical Company, "Niax" from Union Carbide, "Desmodur" from Bayer, "Nacconate" from Allied Chemical and "Suprasec" from Imperial Chemical Industries.

The pre-reacted adducts of the aryl dioximes and polyisocyanates described in Barker U.S. patent application Ser. No. 308,778 filed Nov. 22, 1972, may also be used in the invention. These adducts are characterized by the fact that all of the oxime groups of the dioxime moiety are reacted with isocyanate and by the fact that the molar ratio of the isocyanate moiety to the dioxime moiety of the adduct is in the range from 2:1 maximum to 1:1 minimum. The preferred adducts have a molar ratio of isocyanate moiety to dioxime moiety of about 2:1. The adducts can be produced by adding the two reactive moieties, the aromatic dioxime and polyisocyanate, together in the presence of an anhydrous reaction medium such as an inert organic liquid. This may be done, for example, by rapidly adding the polyisocyanate to a slurry of the aromatic dioxime in an inert organic liquid. Alternatively, a slurry of the aromatic dioxime in an inert organic liquid may be added slowly to a solution of the polyisocyanate in an inert organic solvent. In any event, in order to achieve complete reaction of the oxime groups of the dioxime with isocyanate, it is essential that at least the stoichiometric equivalent and preferably an excess of isocyanate be employed. In general, it has been found that the molar ratio of the polyisocyanate reactant to the dioxime reactant should be in the range from 1:1 up to about 2.5:1. In this way the essential stoichiometric proportion of isocyanate to oxime group is always obtained. While the molar ratio of polyisocyanate to dioxime may exceed 2.5:1, this is uneconomic since the resulting adduct cannot have such a ratio of greater than 2:1. The solid reaction product is separated from the liquid reaction medium by any suitable means such as filtration, washed with a suitable inert organic solvent to remove any unreacted polyisocyanate, and dried by conventional means such as in a vacuum oven. It will be obvious to those skilled in the art that the reactants, reaction medium, reaction vessel and washing liquid should be dry, i.e., free from water, since the isocyanate group reacts with water. While not essential, a suitable catalyst such as triethylene diamine may be employed at a suitable concentration such as about 1%, more or less.

Any suitable anhydrous inert organic liquid may be employed as the reaction medium, solvent or washing liquid. Among such liquids, toluene, trichloroethylene (TCE) and methyl ethyl ketone (MEK) are preferred because of their ready availability.

The reaction conditions will vary somewhat, as would be expected, depending upon the relative reactivity of the reactants, whether or not a catalyst is employed, the concentration of the reactants and catalyst, and so forth. With some reactants the reaction will proceed at room temperature and go to completion in a short time without a catalyst, whereas with other reactants it may be necessary to employ a catalyst and somewhat elevated temperatures up to about 70°C. in order to complete the reaction in a convenient time period.

As noted above, the aryl dioxime and polyisocyanate components of the vulcanization system or a pre-reacted aryl dioxime-polyisocyanate adduct are incorporated into the elastomer to be cured by conventional dispersion techniques such as by the use of an internal mixer or rubber mill. The cross-linking components are incorporated in amounts to give a total concentration of the vulcanizing system of about 2 to about 13 phr or preferably about 5 to about 9 phr in the elastomer. Of this total content of combined vulcanizing composition about 1 to about 9 phr will be polyisocyanate, the remainder being aryl dioxime which will be present in amounts of about 1 to about 6 phr of the total vulcanizing composition. It should be noted that the concentrations are given in phr which, in this art, is understood to mean parts per 100 parts of rubber, by weight.

The new vulcanizing system, unlike the non-sulfur vulcanizing systems of the prior art, is applicable to all diene elastomers although in varying degrees. More specifically, the new system provides excellent cures in natural rubber, styrene-butadiene rubber (SBR), and Neoprene rubber for example and satisfactory cures in even the more difficult-to-cure, less highly unsaturated rubbers such as butyl rubber and EPDM rubber. It is apparent, therefore, that the new system provides a general purpose, non-sulfur vulcanization system for a wide variety of unsaturated elastomers which is less expensive than the bis-maleimide and diurethane vulcanizing systems of the prior art.

It should also be noted that the new vulcanization system omits and requires no substitute for the oxidizing agents such as the lead oxides or dibenzothiazyl disulfide and the like which are disclosed by the prior art to be necessary to obtain cross-linking with aryl dioximes such as p-benzoquinone dioxime (QDO). While optional, it has been found beneficial in most instances to employ an accelerator such as zinc dimethyldithiocarbamate (ZDMC or "Methyl Zimate") which, of course, is not an oxidizing agent. While the aryl dioxime-polyisocyanate adducts described above are operable in the invention, it has been noted that somewhat higher levels of the adducts are required to give equivalent cures. This may be due to the time required for the adduct to break down under vulcanizing conditions. Depending upon the particular elastomer, curing can be carried out at temperatures ranging from about 240°F. up to about 400°F. or more, for a time appropriate to the temperature. For example at 240°F. several hours may be required to achieve the desired cure, whereas at the higher temperatures curing may occur in a few minutes. For most elastomers, representative curing conditions are 288°F. to 320°F. for 5 to 30 minutes.

In order to improve the direct bonding properties of the diene elastomers, it is necessary that the ratio of polyisocyanate to aryl dioxime be such as to provide free unreacted isocyanate in the elastomer before it is cured. It has been found that the concentration level of aryl dioxime required for this purpose is not particularly critical and is suitably in the lower part of the 1 to 6 phr range employed for vulcanization purposes; i.e., about 1 to 3 phr, about 2 phr being sufficient in most cases. The concentration of polyisocyanate on the other hand should be in the upper portion of the 1 to 9 phr range used for vulcanization; about 6 to 9 phr being preferred. The aryl dioxime and polyisocyanate are preferably milled into the uncured elastomer as such although they may also be pre-reacted to form an adduct before incorporation in the elastomer. The use of the adducts to improve the adhesive properties of the elastomers is less preferred, however, since it is generally necessary to employ higher concentration levels and longer cure times to achieve comparable results. Direct bonding is achieved without the use of a primer with natural rubber and polychloroprene. However, in order to achieve direct adhesion of butyl, nitrile, and SBR rubbers, it is generally necessary to prime the substrate with a polyisocyanate of a type referred to above.

The compounded elastomers are cured under conditions of time, temperature and pressure which are conventional in the art for the vulcanization of elastomers. A suitable accelerator, such as zinc dimethyldithiocarbamate (ZDMC), while optional, is preferably employed as described above. The elastomer is cured in situ on the substrate to which it is to be adhered whether it is composed of the same elastomer or another elastomer or some other substrate. Mechanical pressure is employed to assure intimate contact and proper bonding. The new method provides direct bonds between a wide variety of diene elastomers and a wide variety of substrates including the same or different elastomers, synthetic and natural materials including synthetic and natural cellulosic materials such as cotton and rayon, polyester resins, polyamides such as nylon, metals such as steel, brass, and copper, and aluminum and its alloys, fiberglass, etc. In general, about 6 to 9 phr of polyisocyanate is desirable when bonding rubber to steel; about 6 to 12 phr for bonding rubber to brass; and about 4 to 8 phr for bonding rubber to polyester, but the optimum levels for any particular system and substrate must be determined empirically. Conventional preliminary surface treatments are preferably employed when bonding metal substrates, such as grit blasting, persulfate, solvent and other treatments known to the art.

The system of the invention may be used at usual levels without providing free isocyanate when conventional primers or adhesives are to be employed to aid in bonding the elastomer.

The invention will now be illustrated in greater detail in the following specific working examples which are illustrative only and are not to be construed as limiting the invention.

EXAMPLE 1

A standard natural rubber stock formulation was prepared containing 100 parts of Smoke Sheet No. 1, 50 parts of carbon black (SRF type), 4 parts calcium oxide and 2 parts "Methyl Zimate" accelerator. Two series of samples were made up from the foregoing master batch. In one series p-benzoquinone dioxime (QDO) was dispersed at the 2 phr level and in the other at the 4 phr level. In each series of samples a polymethylene polyphenyl isocyanate (available from Upjohn as "PAPI") was dispersed at concentrations of 0, 1, 2, 3, 4, 5 and 6 phr in seven samples respectively. The unvulcanized samples were then tested on the Monsanto Rheometer using ASTM standard D2706-68T to determine the rate and degree of vulcanization obtained. The samples containing the QDO and polyisocyanate ("PAPI") in phr ratios of 2:6 and 2:3 gave particularly satisfactory vulcanization. With the exception of the sample containing no polyisocyanate, all of the samples tested gave excellent vulcanization properties. The sample containing the vulcanizing composition at a QDO:"PAPI" ratio of 2:3 gave the fastest cure rate and is preferred for that reason and also because of its low cost due to the lower levels of the components.

EXAMPLE 2

In order to compare a QDO-"PAPI" vulcanization system of the present invention with QDO alone and as employed in the prior art with an oxidizing agent, a series of samples was prepared employing the natural rubber master batch of Example 1. The samples were compounded with the following vulcanization systems:
1. 6 phr QDO
2. 6 phr QDO + 3 phr "PAPI"
3. 6 phr QDO + 4 phr red lead
4. 6 phr QDO + 4 phr red lead + 3 phr "PAPI"
5. 4 phr red lead + 3 phr "PAPI"

When the foregoing samples were tested on the Monsanto Rheometer as before, samples (1), (3) and (5) gave very poor vulcanization properties; the maximum torque obtained being less than 5 inch pounds above the initial viscosity. Therefore, QDO alone, QDO with red lead, and "PAPI" with red lead, are not practical vulcanization systems. Samples (2) and (4), on the other hand, gave excellent vulcanization properties producing an increase in torque of about 40 inch pounds. This clearly demonstrates that red lead, as used in sample (4), is not necessary in the present invention since sample (2) employing 6 phr QDO and 3 phr PAPI had the same order of effectiveness as sample (4) which also contained 6 phr QDO and 3 phr "PAPI" plus 4 phr red lead.

EXAMPLE 3

A sample of styrene-butadiene rubber (SBR) was compounded from 100 parts gum stock, 50 parts HAF carbon black, 1 part stearic acid, 8 parts of a petroleum plasticizer, 2 parts of zinc dimethyldithiocarbamate (ZDMC) accelerator, 2 parts QDO and 3 parts "PAPI", all by weight, by mixing these materials on a conventional rubber mill. This sample was also tested on the Monsanto Rheometer at 307°F. as before and gave an excellent cure profile showing a 30 inch pound increase in torque. Cure was continued for 22 minutes; the resulting vulcanizate had a Shore durometer hardness of 59 and a percent compression set of 48.7 on average.

EXAMPLE 4

In order to illustrate the effectiveness of the new vulcanization system on another diene elastomer, a Neoprene rubber was compounded as before by mixing 100 parts of a Neoprene gum stock, 75 parts of carbon black ("Sterling FT"), 10 parts of a processing oil ("Circo" oil), 4 parts of a magnesium oxide activating agent ("Maglite D"), 1 part stearic acid, 1 part petrolatum, 2 parts QDO, 3 parts of "PAPI" polyisocyanate and 2 parts of "Methyl Zimate" accelerator. The resulting rubber was cured at 307°F. for 15 minutes while being tested on the Monsanto Rheometer. An excellent cure profile was obtained showing a 60 inch pound increase in torque. The vulcanizate had a Shore durometer hardness of 65 and a percent compression set of 59.4 on average.

EXAMPLE 5

A butyl rubber was compounded as in the previous examples employing 100 parts of a butyl gum stock ("ENJAY 325"), 50 parts of carbon black (HAF), 1 part of stearic acid, 2 parts of QDO, 3 parts of "PAPI" polyisocyanate and 2 parts of "Methyl Zimate" accelerator. This rubber when tested on the Monsanto Rheometer at 307°F. was 90% cured in 32 minutes and showed a low but acceptable cure profile with a 15 inch pound increase in torque. The vulcanizate had a Shore durometer hardness of 61 and a percent compression set of 43.4 on average.

EXAMPLE 6

An ethylene-propylene-diene terpolymer rubber was compounded as before from 100 parts of gum stock (Du Pont "Nordel 1070"), 80 parts of carbon black (HAF type), 40 parts of an oil ("Flexon 765" from Humble Oil Company), 1 part of stearic acid, 2 parts QDO, 3 parts of "PAPI" polyisocyanate and 2 parts of "Methyl Zimate" accelerator. Here again the cure profile was low but acceptable when tested on the Monsanto Rheometer at 307°F. and the vulcanizate had a Shore durometer hardness of 60 and a percent compression set of 45.7 on average.

EXAMPLE 7

A series of tests was conducted to compare the use of pre-reacted aryl dioxime-polyisocyanate adducts with the use of the corresponding unreacted systems in vulcanizing an elastomer. A standard natural rubber stock formulation was prepared from 100 parts of Standard Malaysian Rubber (SMR) gum stock, 50 parts of SRF carbon black and 2 parts of "Methyl Zimate" accelerator. One sample of the standard stock was compounded with 1.4 parts of QDO and 4.6 parts of methylene bis(4-phenyl isocyanate) (MDI). A second sample was compounded with the same amount 6 phr of the adduct (QDM) of QDO and MDI prepared from two moles of the latter to one of the former according to Barker U.S. Ser. No. 308,778 referred to above. The compounded rubber also contained 4 phr of calcium oxide as a drying agent in each case. When these samples were tested on the Monsanto Rheometer as before at 307°F. both gave low cure profiles; that of the sample containing the QDO and MDI as such giving a torque 17 inch pounds higher than that achieved by the QDM adduct. This illustrates the fact that the adducts are somewhat less active than the individual components and that in some cases it may be necessary to use the individual components rather than the adducts to achieve the desired rate or degree of cure.

EXAMPLE 8

In order to compare the efficiency of a vulcanization system employing unreacted QDO and "PAPI" polyisocyanate with the corresponding system employing the adduct (QDP) of these components, a Standard Malaysian Rubber (SMR) stock was compounded from such gum and 50 phr of SRF type carbon black and 2 phr of "Methyl Zimate" accelerator. Two test samples were compounded from the base stock, one by blending in 2 phr of QDO and 10.4 phr of "PAPI" individually, and the other by blending in 12.4 phr of the QDP adduct. The QDP adduct contained the "PAPI" and QDO in a molar ratio of 2:1 and was prepared as disclosed in Barker U.S. Ser. No. 308,778 referred to above.

When tested on the Monsanto Rheometer at 307°F. as above, the QDO-"PAPI" sample had a scorch time of 3.3 minutes, a torque of 90% cure of 61 inch pounds, a curing time to 90% cure of 45 minutes and a maximum torque of 67 inch pounds. The QDP sample had a scorch time of 3.5 minutes, the same 61 inch pound torque at 90% cure, a shorter cure time to 90% cure of 37 minutes and about the same maximum torque of 66 inch pounds. Therefore, in this case the adduct QDP exhibited a more rapid cure than the simple mixture of the components, as opposed to the opposite result with QDO-MDI system of Example 7.

EXAMPLE 9

In order to illustrate the use of aryl dioximes other than the preferred QDO, tests were run on samples compounded with a basic natural rubber stock like that of Example 8, but containing 2 phr of QDO and 3 phr of "PAPI" polyisocyanate in one case and 5 phr dibenzoyl-quinone dioxime (DB-QDO) and 3 phr of "PAPI" in the other case. When these samples were tested as before the sample containing the QDO-"PAPI" system had a scorch time of 2.7 minutes, a torque at 90% cure of 48 inch pounds, a cure time to 90% cure of 13 minutes, a maximum torque of 52 inch pounds, an average tensile strength of 2910 lbs., a modulus at 100% elongation of 290 lbs., and at 300% elongation of 1790 lbs., and an average elongation before failure of 425%. The other sample containing the DB-QDO-"PAPI" system had a scorch time of 3.7 minutes, a torque at 90% cure of 50 inch pounds, a curing time to 90% cure of 30 minutes. a maximum torque of 56 inch pounds, an average tensile strength of 2480 lbs., a modulus at 100% elongation of 300 lbs., and at 300% elongation of 1825 lbs., and an average elongation prior to failure of 390%. It can be seen, therefore, that while the dibenzoyl-quinone dioxime provides a slower rate of cure, it is otherwise comparable to QDO in combination with "PAPI" in a system of the invention.

EXAMPLE 10

In order to further illustrate the preferred embodiment of the invention a mill mix was prepared according to conventional procedures from 100 parts of Standard Malaysian Rubber, 50 parts of SRF carbon black, 2 parts of QDO, 3 parts of "PAPI" polyisocyanate and 2 parts of "Methyl Zimate". A sample of this material was heated to 307°F. on the Monsanto Rheometer and found to have a scorch time of 2.7 minutes, a cure time to 90% cure of 11 minutes, a 58 inch pound increase in torque to 90% cure and a maximum torque increase of 62 inch pounds. This material was also found to have a Mooney scorch time at 250°F. of 7 minutes and 5 seconds and at 270°F. of 4 minutes.

EXAMPLE 11

In order to illustrate the direct bonding properties of elastomers cured with the system of the invention, a sample was prepared by compounding 100 parts of Standard Malaysian Rubber (SMR-5), 50 parts of SRF type carbon black, 2 parts of "Methyl Zimate" accelerator, 2 parts of QDO and 9 parts of "PAPI" polyisocyanate. This material was tested on the Monsanto Rheometer at 307°F. as before and found to have a scorch time of 3.5 minutes, a torque of 57 inch pounds at 90% cure, a time to optimum 90% cure of 19 minutes and a maximum torque of 62.6 inch pounds.

Using ASTM D429-68 Method B test procedures, samples of the compounded rubber were cured in situ on various metal substrates by conventional procedures to obtain assemblies having a strip of rubber one inch wide bonded to metal over part of its length but leaving one end free to permit a conventional pull test. In one such sample in which the rubber strip was bonded to steel, rupture occurred at 68 lbs. pull, with the failure being 35% in the elastomer and the remaining failure being in the elastomer-to-metal bond. In a second sample, rupture occurred at 82 lbs. pull, with a stock break occurring in the elastomer; 50% of the rubber remaining on the steel and the remaining failure occurring in the rubber-to-metal bond.

In two samples bonded to solvent wiped brass, the stock broke in both cases, one at 68 lbs. pull and one at 72 lbs. pull; 95 and 100% of the rubber remaining on the brass strips respectively. In two additional samples of the rubber bonded to brass strips pre-treated by dipping one minute in a 25% aqueous persulfate solution, pulls of 54 lbs. and 68 lbs. were required to cause failure which occurred in the rubber to metal bond; 10 and 2%, respectively, of the rubber remaining on the metal. It is apparent from the foregoing that excellent direct bonding was achieved to both steel and brass by natural rubber cured with the system of the invention.

EXAMPLE 12

In order to demonstrate the superior adhesion of the system of the invention over a sulfur vulcanizate control, the following experiment was undertaken:

An SBR masterbatch was compounded from 100 parts gum stock, 50 parts HAF carbon black, 5 parts zinc oxide, 1 part stearic acid, and 8 parts petroleum plasticizer. The sulfur control was prepared by taking 164 parts of the masterbatch and adding 1.7 parts sulfur and 1.2 parts of n-cyclohexyl-2-benzothiazolesulfenamide. Similarly, four additional stocks were prepared by adding 2 parts QDO, 2 parts zinc dimethyldithiocarbamate and 3, 6, 9 and 12 parts "PAPI" polyisocyanate to 164 parts masterbatch.

Adhesion of the above stocks was evaluated on grit-blasted and degreased steel which was primed with a "PAPI" polyisocyanate (20% "PAPI" in trichloroethylene). The adhesion samples were prepared and tested according to ASTM D-429-68, method B. Three adhesion samples were tested for each stock.

The sulfur control stock gave no adhesion, while the stock containing 3 parts "PAPI" gave an average of 30 lbs./inch pull, the stock containing 6 parts "PAPI" polyisocyanate gave an average of 36 lbs./inch pull, the stock containing 9 parts "PAPI" gave an average of 54 lbs./inch pull and the stock containing 12 parts of "PAPI" gave an average of 59 lbs./inch pull.

Thus it is shown that the QDO-"PAPI" system provides adhesion superior to that of a sulfur control on a primed substrate. In addition, it is noted that as the free isocyanate is increased, adhesion is increased.

EXAMPLE 13

Using the compounded stocks described in Example 12, a similar bonding study was undertaken to a variety of "PAPI" polyisocyanate treated cords which included clean steel cord, brass-plated steel cord, and two types of brass-plated bead wire cords. The adhesion samples were prepared and tested according to ASTM D2229-68. In all cases, pull result values of the QDO-"PAPI" containing stocks were far superior to the sulfur containing control stock. The highest pull value for the sulfur containing stock was recorded at 37 pounds, while the highest pull value for the QDO-"PAPI" containing stocks was recorded at 146 pounds.

EXAMPLE 14

To demonstrate that the isocyanate works in concert with the aryl dioxime, an experiment was undertaken in which 9 parts of "PAPI" polyisocyanate was added to a natural rubber recipe containing 100 parts smoke sheet, 40 parts HAF black, 3 parts zinc oxide, 2 parts stearic acid, 1 part n-phenyl-beta-naphthylamine, 0.6 part n-oxydiethylene benzothiazole-2-sulfenamide, and 2.15 parts sulfur.

Direct adhesion of the above elastomer was tested in accordance to ASTM D-429-68, method B to grit-blasted degreased steel. No adhesion was obtained in any of the three samples.

EXAMPLE 15

Direct adhesion, without the use of any primer, is illustrated with the following bonding study.

A chloroprene masterbatch containing 100 parts Neoprene GNA gum stock, 75 parts FT carbon black, 10 parts light process oil and 1 part petrolatum was mill mixed. From the above masterbatch, three separate compounds were prepared. Stock "A" was the sulfur control containing 186 parts of the above masterbatch with the addition of 4 parts magnesium oxide, 2 parts n-phenyl-beta-naphthylamine, 5 parts zinc oxide, 1 part stearic acid, and 1 part sulfur. Stock "B" contained 186 parts of the above masterbatch with the addition of 2 parts QDO, 6 parts "PAPI" polyisocyanate and 2 parts zinc dimethyldithiocarbamate. Stock "C" contained 186 parts of the above masterbatch with the addition of 2 parts QDO, 9 parts "PAPI" polyisocyanate and 2 parts zinc dimethyldithiocarbamate.

Adhesion of Stocks "A", "B" and "C" were tested to an untreated tightly-woven eight ounce polyamide fabric by constructing a 5 inch × 7 inch sandwich of the fabric between two ¼ inch thick sections of the elastomer to be tested. Following compression vulcanization for a period of 30 minutes at 307°F., the samples were allowed to cool to room temperature prior to being cut into one inch strips. 180° pull values were then obtained on a conventional tester with the speed set at 2 inch/minute. Recorded units were in lbs./inch.

Under the above testing conditions Stock "A" gave essentially no adhesion with the highest value recorded being 3.5 lbs./inch. Failure occurred between the elastomer and fabric. Stock "B" gave an average pull value of 49 lbs./inch with total failure occurring in the elastomer. Stock "C" gave an average pull value of 51 lbs./inch also with total failure occurring in the elastomer.

Thus it can be seen that the system of the present invention markedly increased the adhesive of Neoprene rubber to a synthetic polyamide fabric. The improvement is so dramatic in this case that acceptable results could probably be achieved employing less than 6 phr of polyisocyanate.

Those skilled in the art will realize that the various elastomers, aryl dioximes and polyisocyanates each have their own peculiar properties and that each combination of aryl dioxime, polyisocyanate and elastomer will have its own optimum curing conditions of concentration of curing agent, time, temperature and pressure. The usual compounding ingredients such as carbon black, processing aids, dryers, accelerators, activators and the like will also affect the curing conditions. Therefore, the concentrations and curing conditions must be selected within the limits given above for each different system, either by knowledge or by trial and error, to achieve an adequate cure. This is, of course, within the skill of the art in view of the disclosure above.

What is claimed is:

1. A method for curing an unsaturated diene elastomer in the substantial absence of an oxidizing agent which comprises incorporating into said elastomer a non-sulfur vulcanizing system consisting essentially of from about 1 to about 6 phr of an aryl dioxime and from about 1 to about 9 phr of an organic polyisocyanate having at least two reactive isocyanate groups to give a total dioxime-polyisocyanate content in the range from about 2 to about 13 phr and sufficient to cure said elastomer, and curing the thus-compounded elastomer.

2. A method according to claim 1 wherein the aryl dioxime is p-benzoquinone dioxime.

3. A method according to claim 2 wherein the organic polyisocyanate is polymethylene poly(phenyl isocyanate).

4. A method according to claim 3 wherein the ratio of p-benzoquinone dioxime to polymethylene poly(phenyl isocyanate) is about 2:3.

5. A method according to claim 2 wherein the organic polyisocyanate is methylene bis(4-phenyl isocyanate).

6. A method according to claim 1 wherein the aryl dioxime and organic polyisocyanate are pre-reacted to form an adduct.

7. A method according to claim 6 wherein the adduct is composed of polymethylene poly(phenyl isocyanate) and p-benzoquinone dioxime in a molar ratio of about 2:1.

8. A method according to claim 1 wherein direct bonding properties are imparted to a compounded elastomer selected from the group consisting of natural rubber and polychloroprene rubber by employing about 1 to about 3 phr of aryl dioxime and about 6 to about 9 phr of polyisocyanate.

9. A method according to claim 8 wherein the aryl dioxime is p-benzoquinone dioxime.

10. A method according to claim 9 wherein the polyisocyanate is polymethylene poly(phenyl isocyanate).

11. A method according to claim 1 wherein direct bonding properties are imparted to a compounded elastomer with respect to a substrate pre-treated with polyisocyanate by employing about 1 to about 3 phr of aryl dioxime and about 6 to about 9 phr of polyisocyanate.

12. A method according to claim 11 wherein the aryl dioxime is p-benzoquinone dioxime.

13. A method according to claim 12 wherein the polyisocyanate is polymethylene poly(phenyl isocyanate).

* * * * *